Patented Aug. 3, 1954

2,685,509

UNITED STATES PATENT OFFICE 2,685,509

OPTICALLY SENSITIZED PHOTOGRAPHIC EMULSION

Frank Peter Doyle and Harry Derek Edwards, Barnet, England, assignors, by mesne assignments, to Eastman Kodak Company, Rochester, N. Y., a corporation of New Jersey No Drawing. Application October 5, 1951, Serial No. 250,022

6 Claims. (Cl. 95—7)

This invention relates to photographic emulsions sensitized with new dyestuffs.

An object of the invention is to provide improved photographic silver halide emulsions of improved sensitivity to light by incorporating therein new dyestuffs as sensitizers.

According to the present invention photographic emulsion is sensitized by a dyestuff having the terminal grouping:

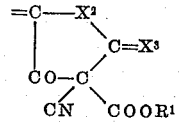

wherein $X^2$ is oxygen or sulphur;
$X^3$ is sulphur or $=NR^2$ ($R^2$ being hydrogen or an organic group such as alkyl or aryl); and
$R^1$ is hydrogen or alkyl.

Particular combinations of substituents in the terminal grouping which have shown satisfactory results when tested are as follows:

(a) $X^2$ is sulphur, $R^1$ is ethyl and $X^3$ is $=NC_6H_5$ or $=NCH_3$ or sulphur.
(b) $X^2$ is oxygen, $R^1$ is ethyl and $X^3$ is sulphur.
(c) $X^2$ is oxygen, $R^1$ is hydrogen and $X^3$ is sulphur.

The new sensitizing dyestuffs may be prepared by reacting a compound of the formula:

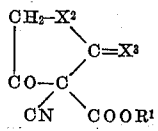

wherein $X^2$, $X^3$ and $R^1$ are as already identified, with a cyanine type dyestuff intermediate containing a group reactive with the $=CH_2$ group of the said compound.

Preferably the cyanine type dyestuff intermediate has one or other of the following formulae:

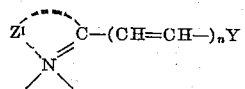

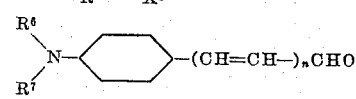

wherein $Z^1$ is the residue of a heterocyclic nucleus;
$R^5$ is alkyl;

$R^6$ and $R^7$ are either the same or different and are alkyl;
$X^4$ is an anion;
Y is a reactive group such as alkylmercapto, acetanilido, or a halogen; and
$n$ is either zero or an integer.

The nature of the reaction is exemplified by the following illustrations:

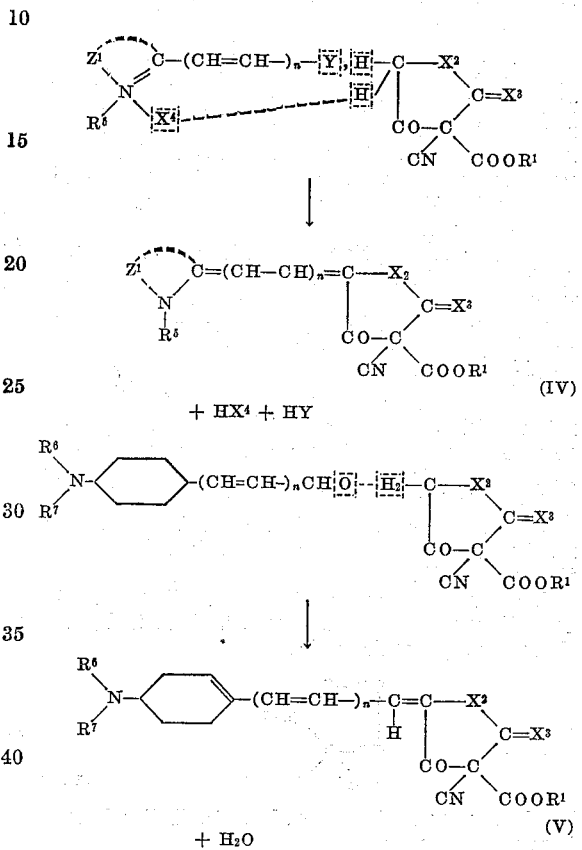

Compounds of Formula I may be prepared in a variety of ways. For instance, the compound 3-carbethoxy-3-cyano-4-keto-2-phenylimino tetrahydrothiophene, of the formula:

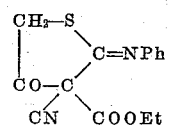

can be prepared by the following reactions (see Ruhemann, J. Chem. Soc., vol. 93, page 626):

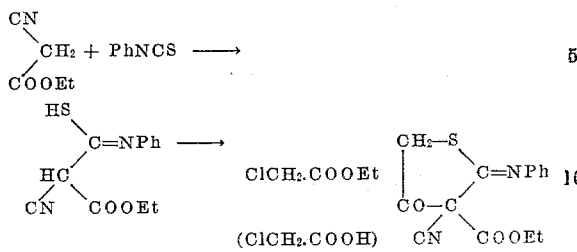

Another suitable compound is similar to that of Formula VI, except that the =NPh group is replaced by =NMe.

Another compound of Formula I, namely 3-carbethoxy-3-cyano-4-keto-2-thiotetrahydrofurane, of the formula:

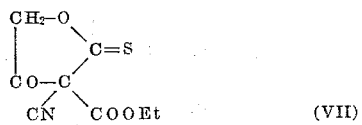

has been prepared in accordance with the following procedure:

12 parts potassium hydroxide were dissolved in 30 parts water and 5.4 parts of ethyl cyanacetate were added. The solution, which had become warm, was cooled to room temperature and 10.3 parts of xanthodiacetic acid monoamide were added. The resulting solution was allowed to stand overnight and was then acidified with dilute sulphuric acid and warmed gently on a water bath for 30 minutes. The solution was cooled and the reddish brown precipitate was filtered. The product was found to be unstable and crystallisable only with difficulty, and was therefore used in its crude form.

Another preparation, which is believed to produce 3-carboxy-3-cyano-4-keto-2-thiotetrahydrofurane, was conducted as follows.

18 parts potassium hydroxide were dissolved in 30 parts water and to the cooled solution was added 6.4 parts cyanacetic acid. The solution was re-cooled and 15 parts of xanthodiacetic acid monoamide were added and the solution allowed to stand overnight. The solution was then acidified with dilute sulphuric acid, and warmed on a water bath for 30 minutes. On cooling, the product precipitated and on filtration a fawn coloured solid was obtained which was used without further purification.

A further compound of Formula I, namely 3-carbethoxy-3-cyano-4-keto-2-thiotetrahydrothiophene, of the formula:

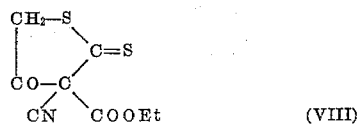

has been prepared in accordance with the following procedure:

*Stage 1.—Dipotassium β cyano β carbethoxy α dimercapto ethylene*

6 parts potassium hydroxide were dissolved in 50 parts absolute ethyl alcohol. The solution was cooled and 5.4 parts ethyl cyanacetate were added, whereupon heat was evolved and a white suspension of potassium salt of ethyl cyanacetate obtained. This suspension was cooled and 5 parts of carbon disulphide were added with vigorous shaking, when a reaction took place; heat was again evolved and the suspended solid passed into the solution which had become bright yellow. A heavy precipitate of a yellow solid quickly appeared, and after allowing the solution to stand 1 hour was filtered and washed with alcohol and ether. The yield was 75% of theoretical.

When a similar procedure was carried out using caustic soda or sodium metal in place of potassium hydroxide, the disodium salt was formed in solution and did not precipitate. The solution of this disodium salt could be used for the following preparation but it is not so convenient as using the isolated dipotassium salt.

The dipotassium salt could also be prepared by using potassium metal dissolved in alcohol in place of the potassium hydroxide.

*Stage 2*

4 parts chloracetic acid were dissolved in 25 ccs. water, and neutralised carefully with solid anhydrous sodium carbonate. 10 parts of dipotassium β-cyano-β carbethoxy α-dimercapto ethylene were added, and the resulting solution was heated for half an hour on a water bath. Alternatively the solution could be stood overnight at room temperature. Dilute sulphuric acid was then added to precipitate the product, which was filtered, washed with water, and dried, when it was obtained as a fawn powder, M. Pt. 120° C.

The product may be purified by dissolving in acetone and reprecipitating with water. The M. Pt. is raised by this purification to 134° C.

As mentioned above, the disodium salt of β cyano β carbethoxy α dimercapto ethylene can be used for this preparation.

A typical compound of Formula II is:

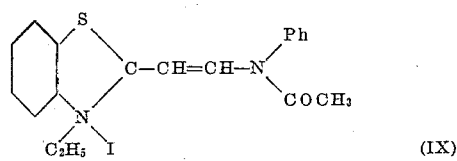

This is a well known dyestuff intermediate.

A suitable compound of Formula III is dimethylamino benzaldehyde.

The following examples illustrate the invention:

EXAMPLE I

*2(3 - ethyl - benzthiazole) - 5 -(3 - carbethoxy - 3 - cyano - 4 - keto - 2 - phenylimino - tetrahydrothiophene) dimethine merocyanine*

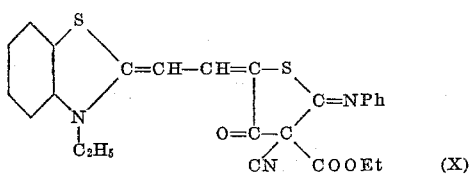

1.5 parts 3-carbethoxy-3-cyano-4-keto-2-phenylimina-tetrahydrothiophene (prepared as mentioned above in respect of Formula VI), 2.2 parts 2-beta-acet-anilidovinyl benzthiazole ethiodide (Formula IX) and 30 parts of pyridine were heated under reflux for 1 hour. The red solution obtained was then poured into 30 parts of water and cooled, when the dyestuff crystallised. This was removed by filtration, washed and crystallised from benzene. M. Pt. 301–2° C.

This dyestuff when incorporated in a gelatine silver iodo bromide emulsion extended the sensitivity to 6500 A° with a maximum at 5700 A°.

EXAMPLE II

2(3 - ethyl - thiazoline) - 5 - (3 - carbethoxy - 3 - cyano - 4 - keto - 2 - phenylimino - tetrahydrothiophene) dimethine merocyanine

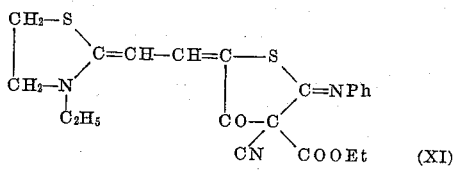
(XI)

1.5 parts 3-carbethoxy-3-cyano-4-keto-2-phenylimino-tetrahydrothiophene, 2.0 parts 2-beta-acet-anilidovinyl thiazoline ethiodide and 30 parts of pyridine were heated under reflux for 1 hour. The orange solution obtained was poured into water, and the dyestuff was isolated as an orange solid in the manner described in Example 1. M. Pt. 265° C.

This dyestuff when incorporated in a gelatine silver iodo bromide emulsion extended the sensitivity to 5900 A° with a maximum at 5100 A°.

EXAMPLE III

2(3-ethyl 5-methyl benzoxazole)-5-(3-carbethoxy-3 cyano-4 keto-2-phenylimino-tetrahydrothiophene) dimethine merocyanine

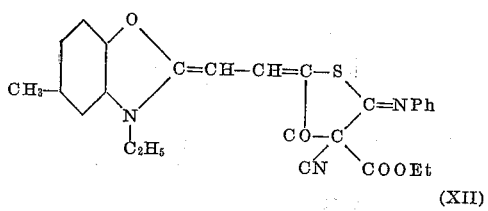
(XII)

1.5 parts 3-carbethoxy-3-cyano-4 keto-2-phenyliminotetrahydrothiophene, 2.2 parts 2 beta - acet - anilidovinyl - 5 - methyl benzoxazole ethiodide and 30 parts of pyridine were heated under reflux for 1 hour. The orange solution obtained was poured into water, and the dyestuff was isolated as in Example I. M. Pt. 311° C.

This dyestuff when incorporated in a gelatine silver iodo bromide emulsion extended the sensitivity to 5,500 A° with a maximum at 5,300 A°.

EXAMPLE IV

2(3-methyl-5-phenyl-benzoxazole)-5-(3-carbethoxy-3-cyano-4-keto 2-phenylimino tetrahydrothiophene) dimethine merocyanine

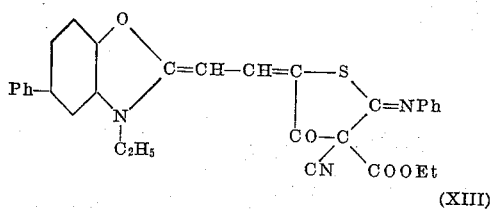
(XIII)

1.5 parts 3-carbethoxy-3-cyano-4-keto 2-phenyliminotetrahydrothiophene, 2.7 parts 2 beta-acet-anilidovinyl-5-phenyl benzoxazole ethiodide and 30 parts of pyridine were heated under reflux for 1 hour. The dyestuff obtained was isolated as in Example I. M. Pt. 322-3° C.

This dyestuff when incorporated in a gelatine silver iodo bromide emulsion extended the sensitivity to 5,500 with a maximum at 5,300 A°.

EXAMPLE V

2(3-ethyl-4:5 naphthoxazole)-5.(3-carbethoxy 3-cyano - 4 - keto - 2 - phenylimino - tetrahydrothiophene) dimethine merocyanine

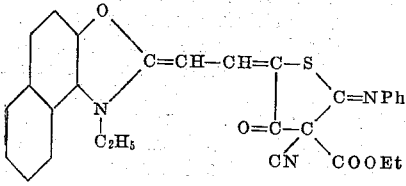
(XIV)

1.5 parts 3-carbethoxy-3-cyano-4-keto-2 phenylimino-tetrahydrothiophene, 2.7 parts 2-beta-acet - anilidovinyl - 4:5 - naphthoxazole etho - p-toluene sulphonate and 30 parts pyridine were heated under reflux for 1 hour. The dyestuff obtained was isolated as in Example I. M. Pt. 354° C.

This dyestuff when incorporated in a gelatine silver iodo bromide emulsion extended the sensitivity to 5,500 A° with a maximum at 5300 A°.

EXAMPLE VI

2(3 - ethyl - thiazoline) - 5 - (3 - carbethoxy - 3 - cyano - 4 - keto - 2 - methylimino - tetrahydrothiophene) dimethine merocyanine

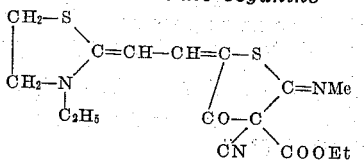
(XV)

1.5 parts 3-carbethoxy-3-cyano-4-keto-2-methylimino tetrahydrothiophene, 2 parts 2-beta-acet-anilidovinyl thiazoline ethiodide and 30 parts of pyridine were heated under reflux for 30 minutes. The dyestuff obtained was isolated as in Example I. M. Pt. 284° C.

This dyestuff when incorporated in a gelatine silver iodo bromide emulsion extended the sensitivity to 5,800 A° with a maximum at 5,200 A°.

EXAMPLE VII

2 - (3 - ethyl - benzthiazole) - 5 - (3 - carbethoxy - 3 - cyano - 4 - keto - 2 - methylimino - tetrahydrothiophene) dimethine merocyanine

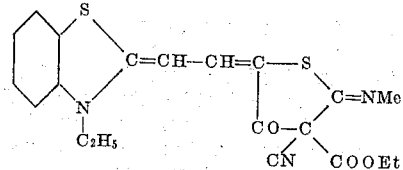
(XVI)

1.5 parts 3-carbethoxy-3-cyano-4-keto-2-methyliminotetrahydrothiophene, 2.2 parts 2 beta-acet-anilidovinyl benzthiazole ethiodide, and 30 parts pyridine were heated under reflux for 1 hour. The dyestuff obtained was isolated as in Example I. M. Pt. 294° C.

This dyestuff when incorporated in a gelatine silver iodo bromide emulsion extended the sensitivity to 5,900 A° with a maximum at 5,700 A°.

EXAMPLE VIII

2(3 - ethyl - benzthiazole) - 5 - (3 - carboxy - 3 - cyano - 4 - keto - 2 - thio - tetrahydrofurane) dimethine merocyanine

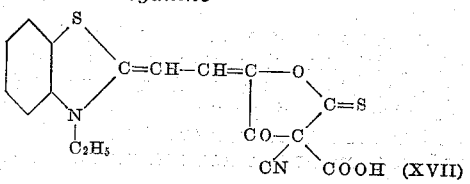
(XVII)

0.85 part 3-carboxy-3-cyano-4-keto-2-thiotetrahydrofurane (prepared by the preparation described above), 2.0 parts of 2 beta-acet-anilidovinyl benzthiazole ethiodide, and 25 parts of pyridine were heated under reflux for 1 hour. The red solution obtained was poured into water, cooled, and the dyestuff removed by filtration and crystallised from ethylene glycol mono methyl ether to give mauve crystals. M. Pt. 287° C.

The dyestuff when incorporated in a gelatino-silver iodo bromide emulsion, sensitized with a maximum at 5800 A° extending to 6050 A°.

EXAMPLE IX

2(3 - ethyl - benzthiazole) - 5 - (3 - carbethoxy - 3 - cyano - 4 - keto - 2 - thiotetrahydrofurane) dimethine merocyanine

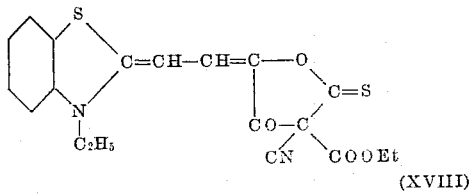

(XVIII)

0.95 part 3-carbethoxy-3-cyano-4-keto-2-thiotetrahydrofurane (prepared by the preparation described above in respect of Formula VII), 2.0 parts of 2-beta-acet-anilidovinyl benzthiazole ethiodide and 25 parts pyridine were heated under reflux for 1 hour. The dyestuff was isolated as in Example VIII in the form of mauve crystals. M. Pt. 295° C.

The dyestuff when incorporated in a gelatino-silver iodo bromide emulsion sensitized with a maximum at 5800 A° extending to 6050 A°.

EXAMPLE X

2(3 - ethyl - thiazoline) - 5 - (3 - carbethoxy - 3 - cyano - 4 - keto - 2 thiotetrahydrothiophene dimethine merocyanine

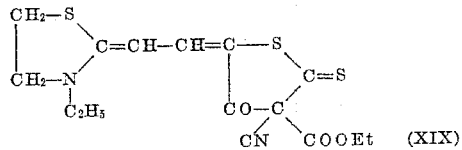

(XIX)

0.5 part 3-carbethoxy-3-cyano-4-keto-2-thiotetrahydrothiophene (prepared as described above in respect of Formula VIII), 1.0 part 2 beta-acet-anilidovinyl thiazoline ethiodide and 20 parts of pyridine were refluxed for 1 hour and then poured into water. The solution was cooled and the dyestuff filtered, washed and re-crystallized from benzene to give crystals. M. Pt. 235–240° C.

EXAMPLE XI

2(3 - ethyl - benzthiazole) - 5 - (3 - carbethoxy - 3 - cyano - 4 - keto - 2 - thiotetrahydrothiophene) dimethine merocyanine

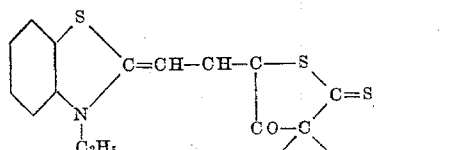

(XX)

8.4 parts 2 beta-ethylthiovinyl benzthiazole etho-p-toluene sulphonate (prepared and reacted in situ), 4.6 parts 3 carbethoxy 3-cyano-4-keto-2 thiotetrahydrothiophene, and 50 parts pyridine were boiled together under reflux for 1 hour. The red solution was poured into water, cooled, and the crude dyestuff separated by filtration. This was crystallised from benzene to give a dark brown amorphous powder. M. Pt. 243° C.

The dyestuff when incorporated in a gelatino-silver iodo bromide emulsion sensitized with a maximum at 5,700 A° extending to 6,800 A°.

EXAMPLE XII

5 - [(3 - ethyl - dihydrobenzthiazolylidene (2))] 3 - carbethoxy - 3 - cyano - 4 - keto - 2 thiotetrahydrothiophene

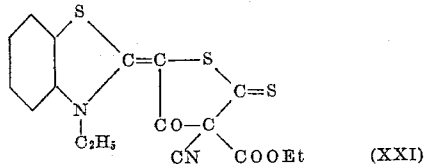

(XXI)

1.15 parts 3 carbethoxy-3-cyano-4-keto-2 thiotetrahydrothiophene, 2.0 parts 2-ethylmercapto benzthiazole etho-p-toluene sulphonate, and 60 parts of pyridine were heated under reflux for 1 hour and poured into water. The yellow precipitate was filtered, washed, and recrystallised from benzene, to give fawn-yellow crystals. M. Pt. 283° C.

EXAMPLE XIII

2 - (3 ethyl - dihydrobenzthiazolylidene (2)) - 3 - carbethoxy - 3 - cyano - 4 - keto - 2 - phenyl-imino-tetrahydrothiophene

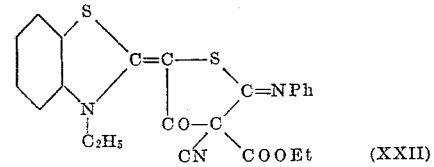

(XXII)

0.7 part 3-carbethoxy-3-cyano-4-keto-2-phenyliminotetrahydrothiophene, 1.0 part 2-ethylmercapto-benzthiazole etho-p-toluene sulphonate, and 30 parts of pyridine, were heated under reflux for 1 hour. The solution, which contained solid dyestuff that had separated during the heating period, was poured into water, and the crude dyestuff removed by filtration. This was crystallised from a large amount of benzene to give yellow crystals. M. Pt. 340° C.

EXAMPLE XIV 2-(3-ethyl benzthiazole)-5(3 carbethoxy 3-cyano - 4 - keto - 2 phenyliminotetrahydrothiophene) hexamethine merocyanine

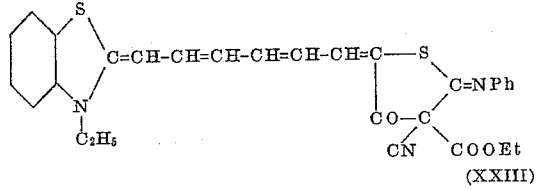

(XXIII)

1.1 parts 2-ω-anilino hexatrienyl benzthiazole ethiodide, 0.7 part 3-carbethoxy-3-cyano-4-keto-2-phenyliminotetrahydrothiophene, 25 parts of pyridine, and 1.0 part of acetic anhydride were heated under reflux and 1.0 part of triethylamine added. The green solution was boiled for 10 minutes, then cooled and diluted with water to precipitate the crude dyestuff. This was filtered and recrystallised from benzene to give dark green crystals. M. Pt. 227° C.

The dyestuff when incorporated in a gelatino-silver iodo bromide emulsion sensitized between 6200 A° and 6700 A°.

EXAMPLE XV

*3 - carbethoxy - 3 cyano 5 - (p - dimethylaminobenzylidine) -4-keto 2-thiotetrahydrothiophene*

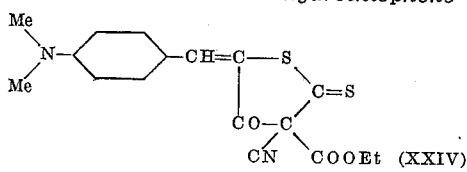

0.75 part p-dimethylamino benzaldehyde, 1.15 parts 3-carbethoxy-3-cyano-4-keto-2-thio-tetrahydrothiophene, and 30 parts absolute ethyl alcohol, were heated under reflux for 30 minutes. The thick red precipitate was then filtered, washed with alcohol, and recrystallised from benzene, to give red needles. M. Pt. 239° C. It should be noted that it was not found necessary to use a condensing agent in this example since a better yield was obtained without it.

The dyestuff when incorporated in a gelatino-silver iodo bromide emulsion sensitized with a maximum at 4,500 A° extending to 5,500 A°.

What we claim as our invention and desire to secure by Letters Patent is:

1. A photographic silver halide emulsion containing as a sensitizer a dyestuff having the formula:

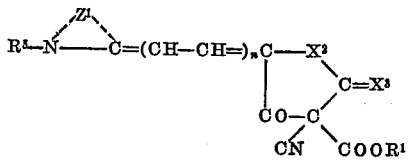

wherein $Z^1$ is the residue of a heterocyclic nucleus;
$R^1$ is selected from the group consisting of hydrogen and alkyl;
$R^5$ is alkyl;
$X^2$ is selected from the group consisting of oxygen and sulphur;
$X^3$ is selected from the group consisting of sulphur and $NR^2$ (where $R^2$ is itself selected from the group consisting of hydrogen, alkyl, and aryl); and
$n$ is zero or an integer from one to three.

2. A photographic silver halide emulsion containing as a sensitizer a dyestuff having the formula:

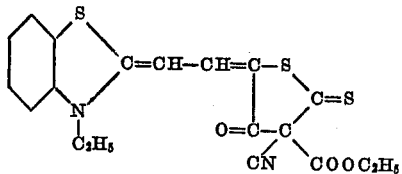

3. A photographic silver halide emulsion containing as a sensitizer a dyestuff having the formula:

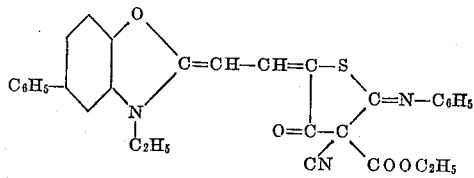

4. A photographic silver halide emulsion containing as a sensitizer a dyestuff having the formula:

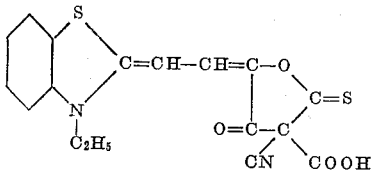

5. A photographic silver halide emulsion containing as a sensitizer a dyestuff having the formula:

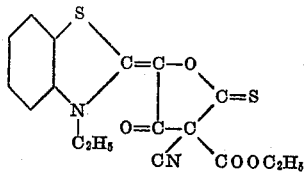

6. A photographic silver halide emulsion containing as a sensitizer a dyestuff having the formula:

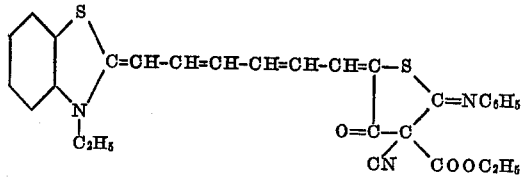

References Cited in the file of this patent

UNITED STATES PATENTS

| Number | Name | Date |
|---|---|---|
| 2,066,099 | Dieterle | Dec. 29, 1936 |
| 2,166,736 | White et al. | July 18, 1939 |
| 2,263,749 | White et al. | Nov. 25, 1941 |
| 2,320,654 | Riester | June 1, 1943 |
| 2,322,015 | Hammer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |

OTHER REFERENCES

Chemical Abstracts, 16:3101 (Abstract of Brit. Med. Journal, 1922, I, 514–515).

Chemical Abstracts, 19:530 (Abstract of Proc. Roy. Soc., London, 96B, 317–333, 1924).